July 13, 1926.  1,592,713
N. BENDIXEN
EXTRACTION, SOLUTION, AND MIXTURE OF SOLUBLE AND INSOLUBLE SUBSTANCES
Filed April 20, 1925   3 Sheets-Sheet 1
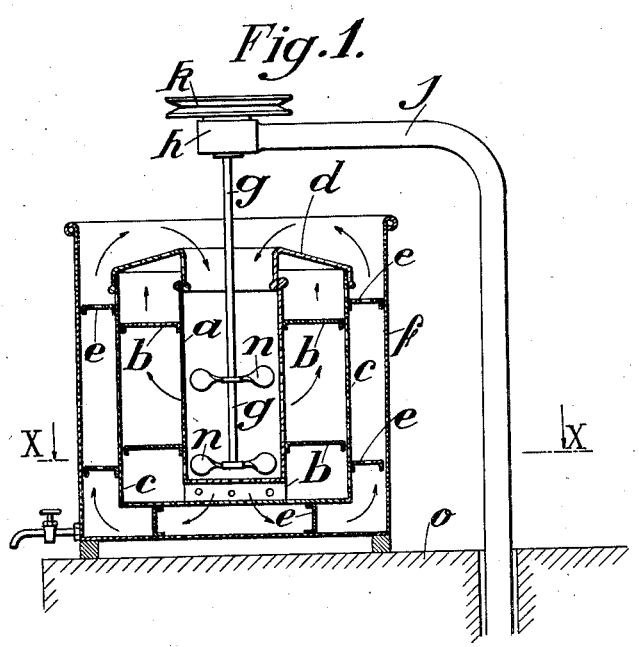
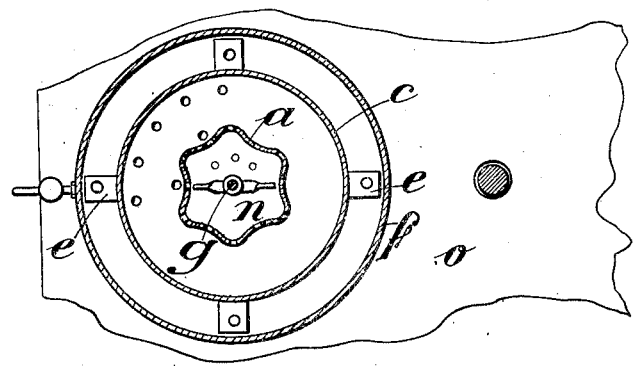
Inventor
N. Bendixen
by Wilkinson & Fiusta
Attorneys.

July 13, 1926.
N. BENDIXEN
1,592,713
EXTRACTION, SOLUTION, AND MIXTURE OF SOLUBLE AND INSOLUBLE SUBSTANCES
Filed April 20, 1925     3 Sheets-Sheet 2
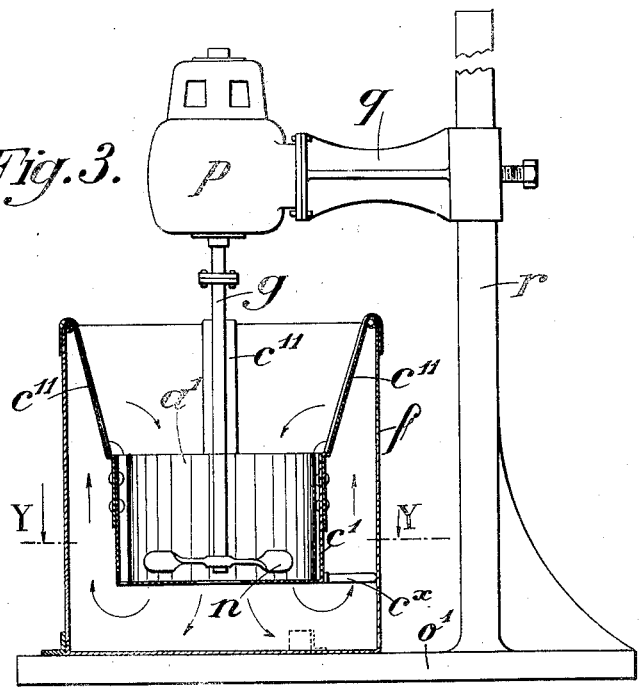
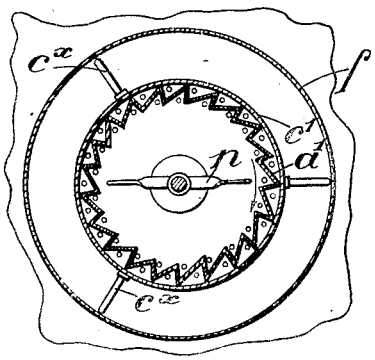
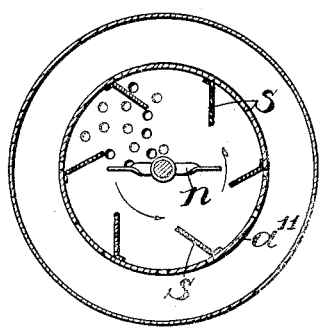
Inventor
N. Bendixen
by Wilkinson & Giusta
Attorneys.

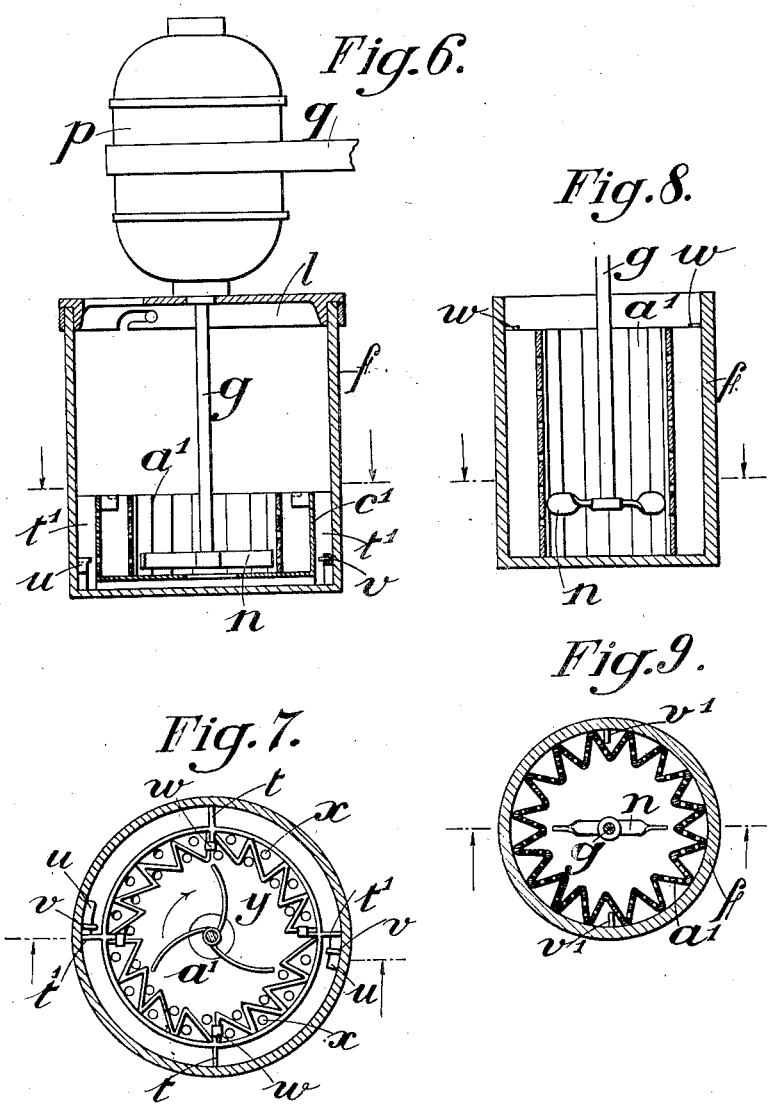

Patented July 13, 1926.

1,592,713

UNITED STATES PATENT OFFICE.

NIELS BENDIXEN, OF LONDON, ENGLAND, ASSIGNOR TO THE F. R. M. COMPANY, LIMITED, OF LONDON, ENGLAND, A BRITISH COMPANY.

EXTRACTION, SOLUTION, AND MIXTURE OF SOLUBLE AND INSOLUBLE SUBSTANCES.

Application filed April 20, 1925, Serial No. 24,634, and in Great Britain August 27, 1924.

This invention relates to the extraction of soluble substances from vegetable and like material, e. g. barks, roots and gums, and has for its object to reduce the time necessary for such extraction, and to render the extraction more nearly complete than has been possible heretofore. The invention also relates to the solution of soluble substances as well as to the mixing of solutions or other liquids with insoluble substances, such as oils, fats or other solids, e. g. in the formation of emulsions or suspensions.

According to this invention, there is provided a rotary impeller, screw propeller, vane wheel or the like, hereinafter referred to as a "propeller", which is adapted to rotate in a liquid container, and a grid or perforated wall which is arranged in the path of the liquid projected from said propeller and which is provided with corrugations or serrations extending transversely to the substantially circular path of such liquid.

For example the grid may consist of a tube or tubular vessel the peripheral walls of which are corrugated or serrated and are also perforated and which has its axis substantially coaxial with the axis of the propeller. This tube or tubular vessel is supported in an outer vessel in such a manner as to leave a space or an annular series of spaces between its outside and the inside wall or walls of the outer vessel. The bottom of the said inner vessel is open or perforated and with or without substantially radial corrugations or serrations. In cases where the apparatus is to be used for the extraction of soluble substances from vegetable or like material or for the solution of gums, an intermediate coaxial vessel, which is preferably provided with a perforated wall or walls, is arranged between the inner tube or vessel and an outer container, so as to leave a clear space between the interior wall of the intermediate vessel and the exterior of the inner vessel to receive the material to be treated, and an annular space between the intermediate vessel and the inned wall of the container. When the apparatus is to be used for the formation of an emulsion, the inner wall of the intermediate vessel or of the container itself is arranged so as to touch the outer crests of the corrugation or serrations of the inner vessel, the longitudinally extended columns or conduits formed by the corrugations or serrations of the inner vessel and the intermediate vessel, having one or both of their ends open so that the fluid which enters their interior spaces through the perforations is directed to form streams of fluid which pass over the exterior surface of the inner vessel in a general direction at right angles to that of the fluid passing through the perforations or about to pass through the perforations on the inner or impeller side.

The machine above mentioned thus forms an embodiment of a process for bringing a soluble or insoluble substance into a fine state of subdivision and mixing the particles of such substance with a liquid, such process consisting in projecting the substance and the liquid together at a high speed against one side of a perforated screen, which is preferably arranged obliquely to the direction of projection, and as the substance suspended in the liquid is impacted against the perforated screen on one side of its surface, at that instant the portion covering partially or wholly the lumen of a perforation is torn off from the portion impacted on this surface of the screen by a current of liquid passing rapidly through the perforation, and then this torn-off portion as it emerges at the other side of the screen, in its passage through the perforation, meets with a stream of fluid passing over the other side of the screen at right angles to the direction of its own motion; and this stream tears off further portions of the suspended substance as it protrudes in passing through the screen. Thus the substance suspended, as for instance an oil, fat, grease or other solid, in a watery fluid, is rapidly divided into numerous globules or particles, which become separately suspended in the fluid when the latter is of a suitable nature, so as to form an emulsion or suspension. The diameter of these globules or particles soon becomes much smaller than the diameter of the perforation in the screen, because the oblique direction in which they are made to impinge on the screen causes a virtual diminution of the lumen of the perforations presented to their passage ranging from the full lumen down to zero, and whenever a globule or particle is too big to have free passage through the virtual lumen presented to its passage, it becomes subjected to the above described shearing forces created by the cross currents of the fluid acting at the edges of the lumen of the perforation.

In the accompanying drawings, there is shown how the said invention may be conveniently and advantageously carried into practice. In such drawings:—

Figure 1 is a vertical central section, and Figure 2 a horizontal section on the line X—X, Figure 1, showing my invention applied to the construction of an extractor or percolator.

Figure 3 is a side elevation, partly in vertical central section, and

Figure 4 a horizontal section on the line Y—Y, Figure 3, showing the invention applied to the construction of an emulsifier.

Figure 5 is a horizontal section illustrating a modification.

Figures 6 and 7 are corresponding views to Figures 3 and 4 showing a further modification.

Figures 8 and 9 are similar views showing a still further modification.

In the apparatus shown in Figures 1 and 2, there is an inner vessel $a$, which has a corrugated perforated side wall and is supported by means of distance pieces $b$, $b$ in an intermediate perforated cylindrical vessel $c$ in such a manner as to leave a clear space between the vessels. The intermediate vessel $c$ has a conical annular perforated cover $d$, which is removable and has an interior downwardly turned flange arranged to close the space between the inner vessel $a$, which is open at the top, and the vessel $c$.

The intermediate vessel $c$ is supported by means of distance pieces $e$, $e$ in an outer vessel or container $f$ which can be provided with a draw-off cock or other fittings as desired.

Concentrically with the vessel $a$ there is mounted a shaft or spindle $g$, which is capable of being rotated at a high speed in a bearing $h$ on the bracket $j$, for which purpose it is provided at its upper end with a belt pulley $k$. The spindle $g$ bears two vane wheels or impellers $n$, $n$ which are adapted, when rotated, to propel the fluid in which they are immersed, outwardly and downwardly.

The outer vessel $f$ rests on a table $o$ which is capable of being raised and lowered, e. g. by rack and pinion gearing, relatively to the spindle and impellers $n$, $n$ when it is desired to remove, clean, fill or empty the vessels.

In operation, the material to be extracted or dissolved is placed in the annular space between the vessels $a$ and $c$ this space is closed by the perforated cover $d$ and the spindle rotated at a high speed, e. g. 500 to 4000 revolutions per minute depending upon the diameter of the propeller. The liquid in the vessels is then propelled through the perforated wall of the inner vessel $a$ into the annular space containing the material to be treated and then partly through the perforated cover $d$ and partly through the perforated bottom and perforated wall of the intermediate vessel $c$ into the annular space between the intermediate vessel $c$ and the peripheral wall of the container $f$. This liquid from the two annular spaces passes upwards and then inwards into the inner vessel, the liquid forced through the perforated bottoms of the vessels $a$, $c$ joining therewith. By this means a very active circulation is obtained and very rapid extraction or solution of the material is effected.

In the apparatus shown in Figures 3 and 4, which is more especially adapted for the formation of emulsions and suspensions, the inner vessel is made in the form of a tube $a'$ with a serrated peripheral wall, preferably formed of wire gauze, and the intermediate vessel $c'$ is arranged close up to the crests of the serrations so as to form an annular series of passages through each of which a current of liquid flows during the operation of the machine. This vessel is supported in the outer vessel $f$ by means of straps $c''$, hooked over the upper edge of the vessel $f$. Distance pieces $c^x$ are also provided for holding the vessel $c'$ concentric with the vessel $f$ and the spindle $g$. Since the current of liquid in each passage moves substantially at right angles to the streams of liquid or material entering the passages through the perforations in the wall of the inner vessel, the reducing or comminuting action set forth above will take place. If desired, the inner vessel $a'$ may have an open bottom and there may be an open space between the lower edge of the vessel $a'$ and the bottom of the intermediate vessel $c'$, so as to enable liquid under pressure to be supplied to the lower ends of the passages formed by the serrations and thus produce a flow of liquid in such passages independently of that produced by the liquid entering the same through the perforations in the vessel $a'$. In this arrangement, the spindle $g$ is driven by an electric motor $p$ mounted on an arm $q$ adjustably mounted on an upright or uprights $r$ on the table $o'$.

Figure 5 shows a further modification useful for the production of emulsions or suspensions, wherein the inner vessel $a''$ is provided with internally extending perforated baffles $s$ which may be radial or inclined to radii of the vessel, e. g. as shown. In this case, the liquid is projected into the spaces between the baffles and moved through the perforations and then upwards therein in order to return by gravity to the inner or central part of the vessel.

The propellers or impellers may consist of radial or screw paddles which may be perforated or unperforated, or the propellers or impellers may consist of lamellæ which will allow only a small quantity of fluid to pass between them, since their main function is to project the liquid against the peripheral wall of the container.

In the modification shown in Figures 6 and 7, the intermediate vessel $c'$ is supported in the outer vessel $f$ by means of distance pieces $t, t$ which hold it coaxial with the outer vessel $f$ and at the same time hold it at a suitable distance above the bottom of such vessel. Two diametrically opposite distance pieces $t', t'$ are provided with slightly inclined circumferentially extending projections $u, u$ which engage beneath radial pins $v, v$ on the inner wall of the vessel $f$ and serve to retain it in position during the operation of the machine. Each of the distance pieces is provided at its upper part with a circumferentially extending projection $w$ which is bent down at its end, so as to prevent both upward and rotational movement of the serrated inner vessel or tube $a'$, which is preferably formed of wire gauze. In this arrangement the bottom of the intermediate vessel $c'$ is provided with an annular series of perforations $x, x$ through which passes the liquid propelled out of the open ends of the vertical passages formed between the serrated outer wall of the tube $a'$ and the inner peripheral wall of the vessel $c'$, this liquid returning to the interior of the tube through an axial hole $y$ under the action of the partial vacuum produced at the centre of the propeller during the rotation of the same at a high velocity. In this arrangement the motor $p$ is mounted on the cover $l$ of the container $f$, which is connected thereto by a bayonet joint so arranged as to draw itself tight under the torque produced by the rotation of the propeller in the liquid in the container $f$. The whole apparatus may be supported by an adjustable or other bracket $q$ on a stand or the like.

Figures 8 and 9 show a further modification, in which an intermediate vessel is dispensed with, a serrated tube of wire gauze $a'$ being arranged directly in the container $f$. In this arrangement, internally projecting pins $v', v'$ are provided near the bottom of the container for engaging the serrations of the tube $a'$ so as to prevent it from rotating, and bent lugs $w, w$ are provided at the upper part of the container to prevent rotation and also rising of the tube or vessel $a'$ in the container $f$.

In this form, both the centrifugal and centripetal movements of the liquid in the circulation take place through the meshes of the wire gauze. Moreover the propeller may have its vanes adapted to throw the liquid perpendicularly outwards; in the arrangements shown in Figures 3 to 7, the propeller may be arranged to throw the liquid both outwards and downwards, for which purpose a screw propeller or a propeller having straight arms of L-shaped cross section may be employed.

In the above constructions, if the propeller is so shaped as to throw the liquid downwards, the bottom of the inner vessel $a'$ may be in the form of a grid of wire gauze or perforated metal having radial corrugations or serrations against which the liquid projected from the propeller impinges in its circular outward motion.

I claim:

1. An apparatus for the purposes specified and comprising a liquid container, a rotary propeller adapted to rotate in said container, and a perforated wall which is arranged in the path of the liquid projected from said propeller and which is provided externally with channels extending transversely to the substantially circular path of said liquid.

2. An apparatus for the purposes specified and comprising a liquid container, a rotary propeller adapted to rotate in said container, and a perforated wall which is arranged in the path of the liquid projected from said propeller and which is provided with corrugations extending transversely to the substantially circular path of said liquid.

3. An apparatus for the purposes specified and comprising a liquid container, a tubular vessel having a perforated wall formed with corrugations, said vessel being so mounted in said liquid container as to leave a space between the outside of said vessel and the inside of said container, and a rotary propeller arranged in said vessel, substantially co-axial therewith.

4. An apparatus for the purposes specified and comprising a liquid container, a rotary propeller adapted to rotate in said container, a perforated wall which is arranged in said container in the path of the liquid projected from said propeller, and has corrugations extending transversely to the substantially circular path of said liquid, said corrugations having each one side substantially radial relative to the axis of rotation of the propeller.

5. An apparatus for the purposes specified and comprising a liquid container, a tubular vessel mounted in said container and having a perforated wall formed with longitudinal corrugations, a rotary propeller arranged within and substantially coaxial with said tubular vessel, said corrugations having each one side inclined to a radius of the propeller axis.

6. An apparatus for the purposes specified and comprising a liquid container, a tubular vessel having a perforated wall formed with corrugations, said vessel being mounted in said container, a casing secured around said tubular vessel in such a manner as to touch the outer crests of said corrugations, and a rotary propeller arranged within said tubular vessel and substantially coaxial therewith.

7. An apparatus for the purposes specified and comprising a liquid container, a tubular vessel mounted in said container and having a perforated wall formed with corrugations, the outer crests of which extend to the inner wall of said container, and a rotary propeller arranged in said vessel, substantially coaxial therewith.

8. An apparatus for the purposes specified and comprising a liquid container, a tubular vessel having a perforated wall and mounted in said container, inwardly extending perforated baffles arranged in said vessel, and a rotary propeller arranged in said vessel, substantially coaxial therewith.

9. An apparatus for the purposes specified and comprising a liquid container, a tubular vessel having a perforated and longitudinally corrugated wall, and mounted in said container, inwardly extending baffles arranged in said vessel, and a rotary propeller arranged in said vessel, substantially coaxial therewith.

10. An apparatus for the purposes specified and comprising a liquid container, a tubular vessel mounted in said container and having a perforated and longitudinally corrugated wall, inwardly extending baffles arranged in said vessel, a casing arranged around said vessel and within said container, and a rotary propeller arranged in said vessel, substantially coaxial therewith.

NIELS BENDIXEN.